Aug. 11, 1964  P. LIPPKE  3,143,886
INSTRUMENT FOR MEASURING THE FLAT WEIGHT OF SHEET MATERIAL
Filed Nov. 7, 1960  2 Sheets-Sheet 1

PAUL LIPPKE
INVENTOR.

BY
AGENT

PAUL LIPPKE
INVENTOR.

United States Patent Office 3,143,886
Patented Aug. 11, 1964

3,143,886
INSTRUMENT FOR MEASURING THE FLAT
WEIGHT OF SHEET MATERIAL
Paul Lippke, Augustastrasse 17, Neuwied
(Rhine), Germany
Filed Nov. 7, 1960, Ser. No. 67,846
Claims priority, application Germany Nov. 18, 1959
17 Claims. (Cl. 73—432)

My present invention relates to an instrument for measuring the flat weight of a moving web of sheet material such as, for instance, paper, cellulose compounds, cardboard, textiles, plastics or similar material usually manufactured by continuous processes.

In the continuous manufacture of paper and similar sheet material it is desirable to measure constantly the flat weight and, preferably, also the moisture content of the sheet in order to control these parameters so as to assure the uniform quality of the product and to detect the occurrence of irregularities in the production process. As the quality of the product is apt to change not only in the direction of sheet travel but also in a direction transverse to it, the measuring instruments should be displaceable across the width of the sheet to ascertain changes in the aforementioned parameters in the latter direction. These instruments must also be so constructed and installed as not to interfere with the movement of the sheet and should be readily removable from its vicinity if the sheet should break.

It is, therefore, the general object of my invention to provide means for dependably and conveniently measuring in a continuous manner the flat weight of sheet material in both longitudinal and transverse direction.

Another object of this invention is to provide a unitary instrument for the combined measurement of flat weight and moisture content in this manner.

A further object of the present invention is to provide an instrument for the measurement of flat weights, utilizing a source of radiant energy and indicator means responsive to a reflected portion of such energy, in which the distance of both the source and the indicator means from the sheet surface is reduced to a minimum so that the effect of changes in the intervening air layer upon the indicator output will be negligible.

A related object of the invention is to provide means for automatically removing such an instrument from its normal position in close proximity to the path of the sheet upon the occurrence of a major discontinuity in the material to be tested, thereby preventing the accumulation of fresh material at the instrument and the resulting obstruction of the movement of the sheet.

It is also an object of my invention to provide an instrument of the character described which is compact, dustproof as well as moisture-proof, and capable of continuously engaging a moving sheet of paper or the like without creating excessive frictional resistance, generating static electricity or otherwise hindering the motion of the sheet or establishing conditions tending to falsify the result of the measurements taken.

In accordance with the invention I provide, within a housing whose interior is preferably maintained at a substantially constant temperature, a source of radiation (preferably one or more emitters of beta rays) and an indicating array in close proximity to a window formed by a radiation-permeable cover whose effective thickness, i.e. whose ability to reflect the emitted radiation toward the indicator array, is small compared with that of the sheet under test with which it is in immediate contact. The housing may be suitably balanced by a counterweight or the like to minimize the contact pressure exerted upon the sheet by the weight of the housing and its contents; it is supported on a carriage guided for reciprocating motion across the width of the sheet at a speed which is low in comparison with the rate of sheet travel. The radiation-transparent cover plate is advantageously flush with a housing base which also carries a moisture-indicating device, e.g., a conventional stray-capacity indicator, alongside the weight-measuring instrument.

The support for the instrument housing, according to another feature of this invention, comprises a swingable arm adapted to retract the housing from the path of sheet travel in response to a signal indicating sheet failure, such signal being conveniently given by the weight-measuring instrument itself upon a sharp change in reflected radiation. Advantageously, the mechanism for withdrawing the supporting arm is actuated pneumatically from a source of cooling air which normally maintains the interior of the housing at a constant temperature.

In principle, the thickness and, therefore, the weight per unit area of a sheet can be ascertained by the rate of either its absorption or its reflection of incident radiation. If a highly reflecting body (e.g., a metallic plate or cylinder) is placed immediately behind the object, the amount of radiant energy returned to the indicating system is a maximum when no sheet is present and decreases asymptotically toward a certain value (depending upon the character of the material) with increased thicknesses of the interposed sheet. If no highly reflective backing is provided, the indicator input rises asymptotically (with increasing sheet thickness) to the same limiting value from near zero in the absence of a sheet, taking into account the reflection of some radiation at the housing window even when no sheet is present. I prefer to use the latter arrangement since it gives larger increments and, therefore, more accurate measurements with the type of sheet material for which my improved system is principally designed, such as commercial-quality paper having a weight up to 350 or 400 grams per square meter.

The invention will be better understood from the following detailed description and the accompanying drawing which illustrates a preferred embodiment thereof. In the drawing.

Figure 1:
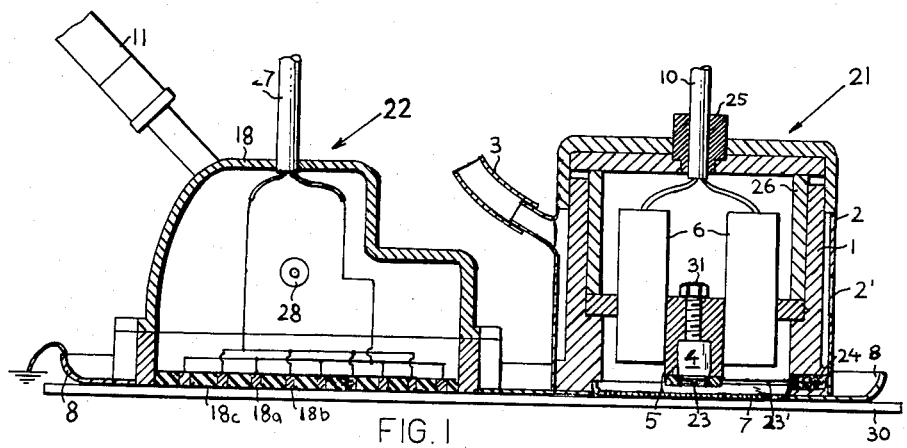
FIG. 1 is a sectional elevation of a compound instrument according to the invention for measuring the flat weight of sheet material.
Figure 2:
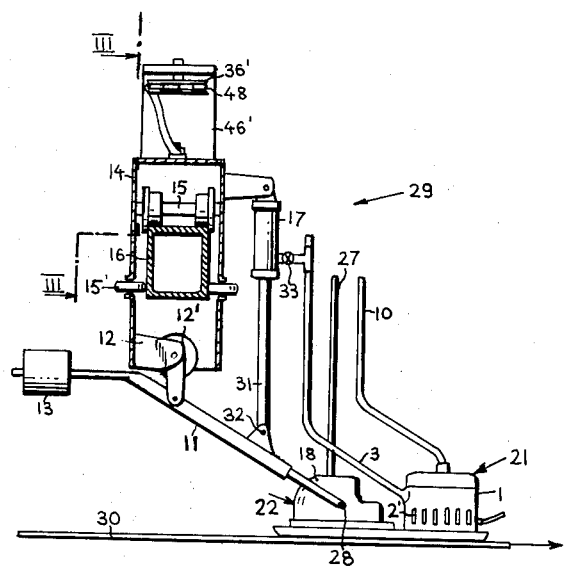
FIG. 2 is an elevational view of the assembly of FIG. 1 with a reciprocable support therefor.
Figure 3:
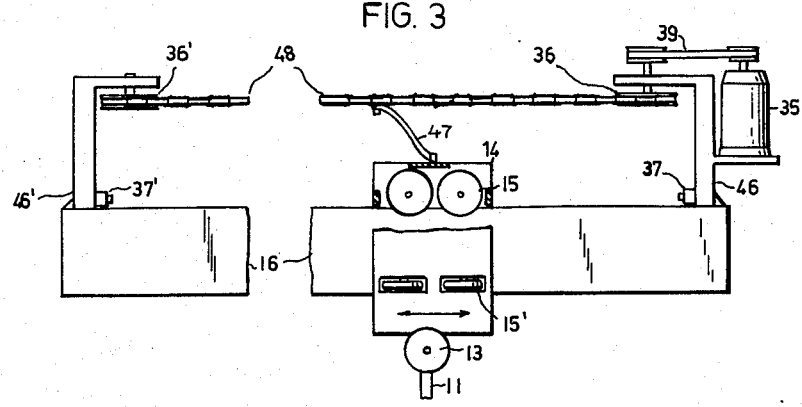
FIG. 3 is an elevational view (parts broken away) of the instrument support taken on the line III—III of FIG. 2.
Figure 4:
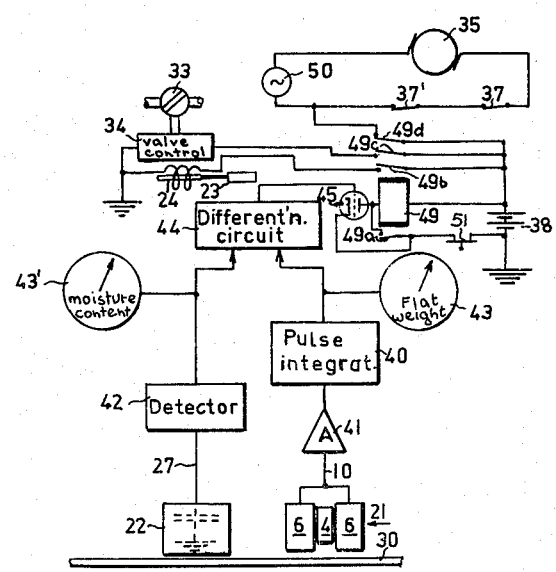
FIG. 4 is a diagram of the electric circuit arrangement associated with the system of FIGS. 1 to 3.

In FIGS. 1–3 an instrument 21 for measuring the flat weight and an instrument 22 for measuring the moisture content of a continuously moving sheet 30 are shown mounted alongside each other on a common base 8 of sheet iron; base 8 is grounded so as to conduct away any charge of static electricity that would interfere with the operation of the measuring instruments. The instrument 21 comprises a housing 1 enclosed in a cooling jacket 2. Cooling air, designed to maintain a constant temperature of preferably less than 75° C., streams from a source not shown through a tube 3 into the space between housing 1 and jacket 2 and escapes into the atmosphere via openings 2' in the jacket 2. A source 4 of measuring radiation, enclosed in a lead shield 5, is installed in the center of the instrument 21 and surrounded by an array of radiation counters 6 (two shown in the drawing) which pass through openings in the shield 5. The counters 6 are provided at their lower ends with entrance ports positioned to receive a maximum of reflected radiation from the surface of sheet 30. The bottom part of the housing is closed by a radiation-transparent cover plate 7 whose underside is flush with that of base 8 and which keeps dust and moisture from entering the measuring part of the instrument. As the instrument 21 rests upon the moving sheet 30, which in turn is carried by rollers or other supporting means not shown, most of the radiation from source 4 is either reflected or absorbed by the sheet material. In order to prevent the escape of radiation from the housing 1 if the sheet 30 should break, the instrument 21 is provided with a diaphragm 23 which overlies the emission end of source 4 and can be closed, against the force of a restoring spring not shown, by a lever 23′ operated by a solenoid 24. A cable 10 leads from the counters 6 via an amplifier 41 to a pulse integrator 40 (FIG. 4). This cable passes through a plug 25 which closes the housing 1 from the top. A collar 26 holds the lead shield 5 in place.

The instrument 22 for measuring the moisture content of the sheet material 30 has a housing 18 provided with a bottom plate composed of interleaved conductor strips 18a, 18b separated by dielectric layers 18c. The strips 18a, 18b energized via respective leads of a cable 27 by a source of alternative current (not shown) in a detector circuit 42 (FIG. 4), act as the electrodes of a condenser whose capacitance depends upon the moisture of sheet 30 with which the elements 18a, 18b, 18c are in contact. Both instruments 21 and 22 can be lifted from the path of sheet 30, when necessary, by a lever arm 11 which is connected to housing 18 by two pivots 28. The lever arm 11 is suitably mounted on a support 29 for the measuring instruments which is illustrated in FIG. 2.

The radiation source 4 preferably consists of one or more beta-ray emitters; various radioisotopes such as strontium 90, krypton 85 or promethium 147 may be used for such purpose. A typical source of this type has the emissive material encased in a cylindrical nickel shell with a rear end wall (top in FIG. 1) of 1.5 mm., a front end wall (bottom) of 0.1 mm. and a peripheral wall of 0.2 mm. thickness; the diameter of its radiant face may be 9.5 mm. Such emitter will be conveniently positioned at a distance of 20 to 30 mm. from the surface of sheet 30, this distance being adjustable by means of a screw 31 in order to set the zero position of a registering instrument 43 (FIG. 4) controlled by the output of integrating circuit 40. Either halogen counters of the Geiger type, preferably with a recovery time of $10^{-4}$ secs., or equivalent scintillation counters may be used for measuring the reflected radiation. The distance between the surface of the sheet 30 and the entrance ports of the counters should be as small as possible, preferably 7 to 10 mm.

Proper selection of the radiation-transparent cover plate 7 used on the instrument 21 is important for the proper operation of the system according to my invention. This plate must be mechanically strong enough to protect the instrument 21 without breaking and sufficiently wear-resistant to prevent any abrasion due to the relatively high speed of sheet travel (up to 100 meters per second) along its outer surface. On the other hand, the flat weight and, hence, the thickness of the cover plate 7 should be kept as low as possible so as to minimize the amount of rays it reflects.

Preferably the plate 7 is made of either a thin mica sheet or a thin foil of synthetic resin of high thermal resistance; it may be provided with a reinforced peripheral portion or with a frame of stronger material (e.g., metal) to increase its mechanical strength. A suitable synthetic material is polytetrafluorethylene ("Teflon") with a preferred thickness of 10 to 15 microns; foam plastics could also be used on account of their low specific weight and high strength. The underside of the cover plate 7, facing the sheet 30, may also be provided with a wear-resistant metal coating such as an aluminum layer of, say, a thickness of 10 microns.

The support 29 for the measuring instruments 21, 22 is provided with a flange 12 which bears a roller 12′ fastened both to the lever arm 11 and to a counterweight 13. The lever arm 11 is connected at a pivot 32 with a bar 31 having at its upper end a plunger (not shown) movable in a vertical direction in a cylinder housing 17 whenever actuated by compressed air which enters cylinder 17 from a tube 3 via an electrically actuated valve 33. The cylinder housing 17 and the flange 12 are fastened to a carriage 14 which is mounted on wheels 15 movable along a beam 16 across the width of the sheet material transversely to its direction of travel; in practice this width may be as much as eight meters. Wheels 15′, arrayed on both sides of carriage 14 to contact the beam 16, provide lateral stability. The carriage 14 is connected, by a link here simply shown as a flexible strap 47, to an endless chain 48 which passes around pulleys 36, 36′. Pulley 36′ can rotate freely whereas pulley 36 is driven by a belt 39 from an electric motor 35 which is mounted on one side of the beam 16. The pulleys 36 and 36′ are supported by respective standards 46, 46′ which rise from opposite ends of beam 16 and carry limit switches 37 and 37′ actuatable by the carriage 14 in its extreme right-hand and left-hand positions as viewed in FIG. 3.

Reference will now be made to FIG. 4 for a description of the principal electrical components associated with the system of FIGS. 1–3 and of its mode of operation. The elements shown in FIG. 4 may be disposed partly within instrument housings 1 and 18, partly at locations remote therefrom.

The outputs of pulse integrator 40 and of detector 42 are fed to meters 43 and 43′, respectively, for indicating the flat weight and the moisture of that portion of sheet 30 which is momentarily in contact with instrument base 8. These outputs are also applied to a differentiation circuit 44 adapted to detect a sharp drop in the measuring voltage delivered by either circuit 40, 42 to apply a positive pulse to the grid of a vacuum triode 45 in the event of a rupture of sheet 30. Tube 45 becomes conductive and causes the energization of a relay 49 from a D.-C. source 38, the relay then locking independently of circuit 44 via its holding armature 49a. At armature 49b the relay 49 energizes the solenoid 24 to close the diaphragm 23 in front of the radiant source 4; at armature 49c it operates a control circuit 34 for opening the valve 33 whereby air under pressure from conduit 3 is admitted into the cylinder 17 to lift the instruments 21, 22 off the path of sheet 30. Armature 49d opens a shunt across the contacts of limit switches 37 and 37′ which are alternately opened at the end of each reciprocation of carriage 14; these contacts lie in series with each other and with a current source 50 operating the motor 35 whereby the latter will be arrested as soon as the carriage 14 reaches one of its extreme positions. Thus, the instruments 21, 22 are kept out of the way while repairs are in progress for the re-establishment of sheet travel; thereupon the opening of a switch 51 in the holding circuit of relay 49 will restore the system to its normal operation by re-energizing motor 35, reversing valve 33 to vent the cylinder 17, and opening the diaphragm 23.

The invention is, of course, not limited to the specific embodiments described and illustrated but may be realized in various modifications and adaptations without departing from the spirit and scope of the appended claims.

I claim:
1. An instrument for measuring the flat weight of sheet material, comprising a support formed with a generally flat guide surface, mounting means for said support urging said guide surface into contact with a surface of said sheet material along a suspended portion thereof, a source of radiation reflectable by said sheet material on said support, said support being provided with a window for passing the radiation from said source to said sheet material, receiving means for reflected radiation positioned on said support in alignment with said window, and indicator means connected to said receiving means for ascertaining the rate of reflection of said radiation by said sheet material.

2. An instrument for measuring the flat weight of a moving web of sheet material, comprising a support formed with a generally flat guide surface, mounting means for said support urging said guide surface into contact with a surface of said web with light pressure along a suspended portion thereof, a source of radiation reflectable by said sheet material on said support, said support being provided with a window for passing the radiation from said source to said sheet material, receiving means for reflected radiation positioned on said support in alignment with said window, and indicator means connected to said receiving means for ascertaining the rate of reflection of said radiation by said sheet material.

3. An instrument according to claim 2 wherein said support is provided with a radiation-transparent foil spanning said window and positioned to lie flat against said web.

4. An instrument according to claim 3 wherein said foil comprises a plate of non-conductive material provided, on its side facing said sheet material, with a protective metallic layer of substantially smaller thickness.

5. An instrument according to claim 3 wherein said foil is primarily composed of a substance selected from the group which consists of mica and synthetic resins.

6. An instrument according to claim 3 wherein said guide surface forms a flat base level with said foil on its side facing said sheet material.

7. An instrument according to claim 6 wherein said support forms a housing on said base surrounding said source and said receiving means, said instrument further comprising conduit means for supplying a steady stream of temperature-stabilizing fluid to the interior of said housing.

8. An instrument according to claim 2 wherein said receiving means comprises an array of radiation counters equispaced from said source and connected in parallel to said indicator means.

9. An instrument according to claim 2 wherein said mounting means comprises a carriage, a swingable arm on said carriage engaging said support, counterweight means anchored to said arm for partially balancing the weight of said support, said support bearing upon said web from above, and drive means coupled with said carriage for reciprocating said support across said web.

10. An instrument according to claim 9, further comprising lifting means connected with said arm and controlled by said indicator means for raising said support off said web upon a change in said rate of reflection indicative of a rupture in said sheet material.

11. An instrument according to claim 10 wherein said support forms a housing about said source and said receiving means, said housing being provided with conduit means for supplying a steady stream of cooling fluid to its interior, said lifting means including a fluid-responsive device connected to said conduit means and valve means responsive to the output of said indicator means for rendering said fluid-responsive device effective.

12. An instrument according to claim 10, further comprising shutter means between said source and said window operable by said indicator means upon said change in rate for substantially preventing the emission of radiation through said window.

13. An instrument according to claim 9, further comprising control means for said drive means responsive to the output of said indicator means for maintaining said support away from the path of said web upon a change in said rate of reflection indicative of a rupture in said sheet material.

14. A system for continuously checking the quality of a moving web of sheet material, comprising a supporting base, mounting means suspending said base above the path of said web for engagement of the latter from above with light contact pressure, a first instrument on said base adapted to measure the flat weight of said sheet material, a second instrument on said base adjacent said first instrument for measuring the moisture content of said sheet material, and drive means for reciprocating said base across said path; said first instrument including a source of radiation reflectable by said sheet material, said base being provided with a window for passing the radiation from said source to said sheet material, receiving means for reflected radiation in alignment with said window, and first indicator means connected to said receiving means for ascertaining the rate of reflection of said radiation by said sheet material; said second instrument including condenser means at said base adapted to contact said web, and second indicator means connected to said condenser means for ascertaining changes in the capacitance of said condenser means.

15. A system according to claim 14, further comprising control means for said mounting means responsive to the output of at least one of said indicator means for maintaining said base away from the path of said web upon a change in said output indicative of a rupture in said sheet material.

16. A system according to claim 15 wherein at least one of said instruments comprises a housing on said base and conduit means for continuously supplying a temperature-stabilizing fluid under pressure to the interior of said housing, said control means including fluid-pressure-responsive means connected to said conduit means and valve means in said conduit means operable by said one of said indicator means for activating said fluid-pressure-responsive means.

17. A system according to claim 14 wherein said first instrument is provided with a radiation-transparent foil spanning said window and positioned level with the underside of said base.

References Cited in the file of this patent

UNITED STATES PATENTS

| | | |
|---|---|---|
| 2,937,280 | Gilman | May 17, 1960 |
| 2,951,161 | Foster et al. | Aug. 30, 1960 |
| 2,966,628 | Bosch | Dec. 27, 1960 |
| 2,968,724 | Clark | Jan. 17, 1961 |